Aug. 16, 1960  S. S. STURGEON  2,949,551
ELECTRODE CONSTRUCTION FOR ELECTROMAGNETIC FLOWMETERS
Filed May 9, 1956
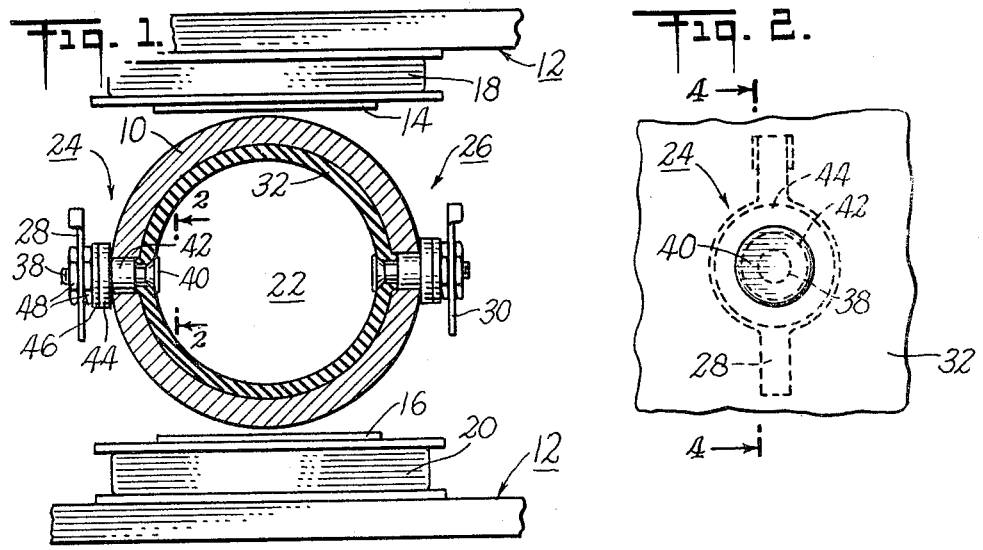
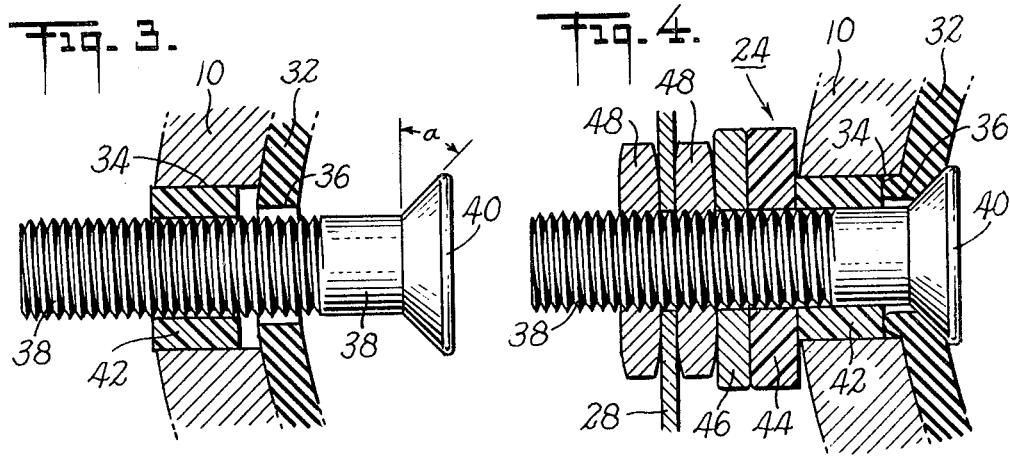
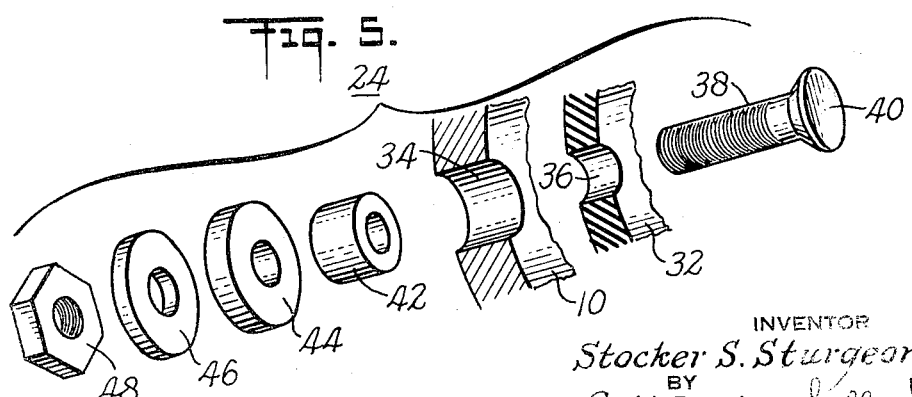
INVENTOR
Stocker S. Sturgeon
BY
Curtis, Morris & Safford
ATTORNEYS

United States Patent Office 2,949,551
Patented Aug. 16, 1960

2,949,551

ELECTRODE CONSTRUCTION FOR ELECTROMAGNETIC FLOWMETERS

Stocker S. Sturgeon, Foxboro, Mass., assignor to The Foxboro Company, Foxboro, Mass., a corporation of Massachusetts Filed May 9, 1956, Ser. No. 583,761

5 Claims. (Cl. 310—11)

This invention relates to electromagnetic flowmeters, and more particularly to improved means for establishing electrical contact with the fluid flowing through such a device.

As is well known, an electromagnetic flowmeter generally includes (1) a pipe section to carry the fluid being measured, (2) means for producing magnetic flux across the pipe, and (3) a pair of electrodes in contact with the fluid and positioned on a line perpendicular to both the direction of fluid flow and the direction of magnetic flux. The fluid passing through the pipe generates a voltage between the electrodes in accordance with the rate of fluid flow, and this voltage commonly is amplified and applied, for example, to recording or controlling devices.

The provision of means for making electrical contact with the flowing fluid has represented a special problem in designing electromagnetic flowmeters. For example, the fluid frequently is under high pressure so that any electrodes inserted through the side wall of the pipe must be arranged to withstand considerable physical stress and at the same time maintain a tight seal to prevent leakage. The problem is made more severe by the requirement that, in order to avoid short-circuiting the generated voltage, such electrodes be electrically insulated from the pipe which commonly is formed of conductive material such as stainless steel.

In my copending application Serial No. 455,949, filed on September 14, 1954, now Patent No. 2,800,016, there is disclosed a flowmeter construction wherein the pipe wall is formed with "cone-shaped" holes, through which the electrodes extend, with the larger aperture of the cones facing towards the interior of the pipe. An insulating washer in the form of a hollow truncated cone is seated in each hole, and similarly cone-shaped electrodes are positioned within the interior of each washer. This arrangement has been used extensively with satisfactory results in commercial electromagnetic flowmeter installations, and is especially advantageous in that, due to the tapered construction, the fluid pressure tends to seat the electrode firmly against the insulating washer to assure a tight, leakproof electrical connection.

I have discovered, however, that performance results at least as good as obtained with the above-described construction may be achieved with a new electrode arrangement that in some respects is more easily produced. This new arrangement, furthermore, is particularly advantageous for use with flowmeter pipes of small inner diameter, e.g. under 2 inches.

Accordingly, it is an object of this invention to provide an improved electrode construction for electromagnetic flowmeters. It is a further object of this invention to provide such an electrode construction that is particularly well suited for industrial fabrication, and that is yet capable of stable performance under a wide variety of operating conditions.

In a preferred embodiment of the present invention, to be described hereinbelow in detail, the flowmeter pipe is formed with a pair of opposed cylindrical holes rather than tapered holes as before. Positioned in the interior of the pipe is a close-fitting semi-flexible insulating liner, formed with a pair of opposed cylindrical holes smaller in diameter than the pipe holes, and located such that the pipe and liner holes are axially aligned. The electrode stems extend through these sets of holes, and cylindrical bushings are provided to insulate the electrodes from the pipe wall.

Each electrode includes a tapered inner head the base of which is wider in diameter than the liner hole, and this head is jammed against the flexible liner under substantial pressure by means of an external draw nut threaded onto the electrode stem. Thus the liner material around each head is compressed tightly to form a flared surface mating with the tapered sides of the head, thereby establishing a pressure-resistant and insulated electrical connection to the fluid passing by.

In effect, the compressed portions of the flexible insulating liner serve as tapered support walls for the electrode heads, resisting outward movement of the electrodes while providing the desired sealing and insulation. An important advantage of this construction is that there is no need for special fabricating techniques, e.g. the electrode holes may be formed from outside the pipe and the insulated liner so that this construction is particularly adaptable to flow pipes of very small size.

Other objects, aspects and advantages of the invention will be in part pointed out in, and in part apparent from, the following description considered together with the accompanying drawings, in which:

Figure 1 is a vertical cross-section view of an electromagnetic flowmeter pipe section provided with fluid-contacting electrodes in accordance with the present invention;

Figure 2 is a detail section taken along line 2—2 of Figure 1, showing the interior face of one of the electrodes;

Figure 3 is a sectional view showing an electrode extending only part way through the pipe wall and the insulating liner;

Figure 4 is a detail section taken along line 4—4 of Figure 2, showing an electrode with its tapered head pressure-seated against the insulating liner; and Figure 5 is an exploded view showing principal elements of the new electrode arrangement.

Referring now to Figure 1, there is shown a flowmeter pipe section 10, e.g. having an inner diameter of 1" and formed of stainless steel approximately 0.1" thick, surrounded by a magnetic core member diagrammatically indicated at 12. This core member includes a pair of inwardly extending legs 14 and 15 each carrying a winding 18 and 20 energized by a source of alternating-current (not shown). The magnetic flux produced by these windings passes vertically across the interior of the pipe section 10 and generates, in accordance with known electromagnetic principles, an alternating-current potential in the fluid 22 moving through the pipe. The magnitude of this potential is determined by the rate of fluid flow.

The potential developed in the fluid 22 is sensed by a pair of identical electrode assemblies, generally indicated at 24 and 26, which extend through the pipe wall 10 in diametrically opposite locations. The inner face of each electrode (see also Figure 2) is flat and round, having a diameter of about 0.17 inch. Outside the pipe wall, the electrode assemblies include terminals 28 and 30 which are connected to wires (not shown) leading to a signal amplifier, flow recorder, etc.

Snugly seated within the interior of the pipe 10 is an insulating liner 32, held securely in place by friction fit or, preferably, adhesive cement. This liner is formed of a stiffly-resilient material, preferably laminated fiber-glass with a plastic impregnation such as the composition known commercially as "Fluorflex-T" (sold by the Resistoflex Corp.), and has a thickness approximately half that of the pipe wall 10.

As particularly shown in Figure 3, the pipe 10 and the insulating liner 32 are formed with coaxial, cylindrical holes 34 and 46 through which the stem 38 of the electrode 24 extends. The diameter of the liner hole is smaller than that of the pipe hole, and the electrode head 40 is flared out at a taper angle "a" of 45 degrees, with the diameter of the electrode inner face substantially greater than the diameter of the liner hole 36. Surrounding the electrode stem 38, within the pipe hole 34, is a cylindrical insulating bushing 42 formed of Teflon.

Figure 4 shows the electrode 24 completely assembled and seated tightly in position with its tapered head 40 pressed hard against the insulating liner 32. Surrounding the electrode stem 38 where it protrudes out beyond the pipe wall 10 is an insulating washer 44, formed of fiber-glass, which abuts the bushing 42 and prevents electrical contact between the electrode and the pipe wall. Adjacent the insulating washer is a brass spacing washer 46, and the entire assembly is held securely in place by a pair of hexagonal nuts 48 threaded on to the electrode stem with the lead-wire terminal 28 held therebetween.

During assembly, the electrode 24 is inserted (see also Figure 5) from within the pipe 10 through the holes 34 and 36; and the bushing 42, washers 44 and 46, and nuts 48 are then placed on the stem 38 along with the lead-wire terminal 28. By drawing the nuts 48 up tight (Figures 2 and 4), the tapered electrode head compresses the surrounding material of the stiffly-resilient insulating liner 32 so that it forms a surface which mates with the tapered surface of the head. The outer portion of this compressed material protrudes into the hole 36, and the compression is carried to such an extent that this outer portion jams against the bushing 42 which thus also serves as a backing against which the liner material is forced.

It can particularly be seen that the resultant precise mating of the tapered surfaces of the head 40 and the liner 32 provides a close-fitting sealed joint and insulates the electrode from the pipe wall. Further, because of the tapering of the engaged surfaces, this joint seals even more tightly if the electrode is placed under additional pressure by the fluid 22 flowing through the pipe. These desirable characteristics are obtained, moreover, by an electrode arrangement that is economical to fabricate and assemble.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

I claim:

1. In an electromagnetic flowmeter, the combination comprising a section of pipe through which fluid may flow, the wall of said pipe being provided with a pair of holes located on opposite sides thereof, the cross-sectional area at any one point in either of said holes being at least as great as the cross-sectional hole area at any other point interiorly of said one point, insulating liner means comprising stiffly-resilient electrical insulating material fitted against the inner surface of said pipe in the regions of said pipe holes and adapted to prevent short-circuiting of electrical currents flowing through the fluid in said regions, said insulating material having a substantially uniform thickness and being provided with holes aligned with the holes through said pipe wall, a pair of electrically-conductive electrodes each including a stem and a head, the stems extending respectively through said holes in said pipe and said insulating material with the heads located in the interior of said pipe, the cross-sectional area of the end surfaces of said heads being greater than the cross-sectional area of the respective stems, the stems being joined to the heads by tapered sections the sloping sides of which are in direct contact with said liner of insulating material, the end surfaces of said heads having a cross-sectional area that is greater than the cross-sectional area of the corresponding holes through said insulating material, and pressure means urging said electrode heads towards the wall of said pipe, the sloping sides of said tapered sections being pressed tightly against said insulating material with sufficient pressure to deform said insulating material around the edges of the corresponding holes into an intimate mating engagement with said tapered sections with said electrode heads effectively flush with the interior surface of said insulating material, said insulating material serving to support said electrodes and prevent axial movement thereof outwardly of said pipe.

2. The combination of claim 1, wherein said holes through said insulating material are smaller than the corresponding holes through said pipe wall, said insulating material being deformed into said holes through said pipe wall and around the electrode stems by the force exerted by said pressure means.

3. The combination of claim 2, wherein said stems are threaded, said pressure means comprising a nut engaged with the respective stem.

4. The combination of claim 3, including rigid bushing means surrounding the part of said stems that extends through said holes in said pipe wall, one end of said bushing means being in contact with said pressure means, the other end of said bushing means being in contact with said insulating material, whereby to support said insulating material and prevent excessive deformation thereof into said holes in said pipe wall.

5. The combination of claim 1, wherein said insulating liner comprises a flexible sleeve extending around the entire inner periphery of said pipe section in the region adjacent said pipe holes on both sides thereof.

References Cited in the file of this patent

UNITED STATES PATENTS

| | | |
|---|---|---|
| 1,797,766 | Frye | Mar. 24, 1931 |
| 1,930,831 | Webb | Oct. 17, 1933 |
| 1,939,286 | Spencer | Dec. 12, 1933 |
| 2,616,949 | Cade | Nov. 4, 1952 |
| 2,766,621 | Raynsford et al. | Oct. 16, 1956 |
| 2,770,130 | Romanowski et al. | Nov. 13, 1956 |
| 2,824,282 | Posey | Feb. 18, 1958 |
| 2,844,568 | Mertz | July 22, 1958 |